(12) United States Patent
Mauritzson et al.

(10) Patent No.: US 7,652,704 B2
(45) Date of Patent: Jan. 26, 2010

(54) PIXEL FOR BOOSTING PIXEL RESET VOLTAGE

(75) Inventors: Richard A. Mauritzson, Boise, ID (US); Joey Shah, Boise, ID (US)

(73) Assignee: Aptina Imaging Corporation (KY)

( * ) Notice: Subject to any disclaimer, the term of this patent is extended or adjusted under 35 U.S.C. 154(b) by 885 days.

(21) Appl. No.: 10/925,172

(22) Filed: Aug. 25, 2004

(65) Prior Publication Data

US 2006/0044438 A1 Mar. 2, 2006

(51) Int. Cl.
*H04N 5/335* (2006.01)
*H01L 31/113* (2006.01)
*H01L 27/00* (2006.01)

(52) U.S. Cl. ............... 348/308; 257/292; 250/208.1
(58) Field of Classification Search ........... 348/308, 348/301, 241; 257/291, 292; 250/208.1
See application file for complete search history.

(56) References Cited

U.S. PATENT DOCUMENTS

| 5,952,686 | A | * | 9/1999 | Chou et al. ............ 257/292 |
| 6,046,444 | A | * | 4/2000 | Afghahi ............... 348/308 |
| 6,850,278 | B1 | * | 2/2005 | Sakurai et al. ......... 348/308 |
| 7,224,389 | B2 | * | 5/2007 | Dierickx ............... 348/308 |
| 7,233,353 | B2 | * | 6/2007 | Xue ..................... 348/294 |
| 2003/0063206 | A1 | * | 4/2003 | Mabuchi ............... 348/301 |
| 2004/0036789 | A1 | * | 2/2004 | Shinohara ............. 348/308 |
| 2006/0285000 | A1 | * | 12/2006 | Mabuchi ............... 348/308 |

OTHER PUBLICATIONS

Shunsuke Inoue et al. —"A 3.25M-pixel APS-C size CMOS Image Sensor," IEEE 2001 Workshop on Charge-Coupled Devices and Advanced Image Sensors, Jun. 2001, pp. 16-18.

* cited by examiner

*Primary Examiner*—Nhan T Tran
(74) *Attorney, Agent, or Firm*—Dickstein Shapiro LLP

(57) ABSTRACT

A pixel cell in which a capacitance is coupled between a storage node and a row select transistor. The pixel cell utilizes a readout timing sequence between operation of a reset transistor and a row select transistor to boost a reset voltage.

20 Claims, 7 Drawing Sheets

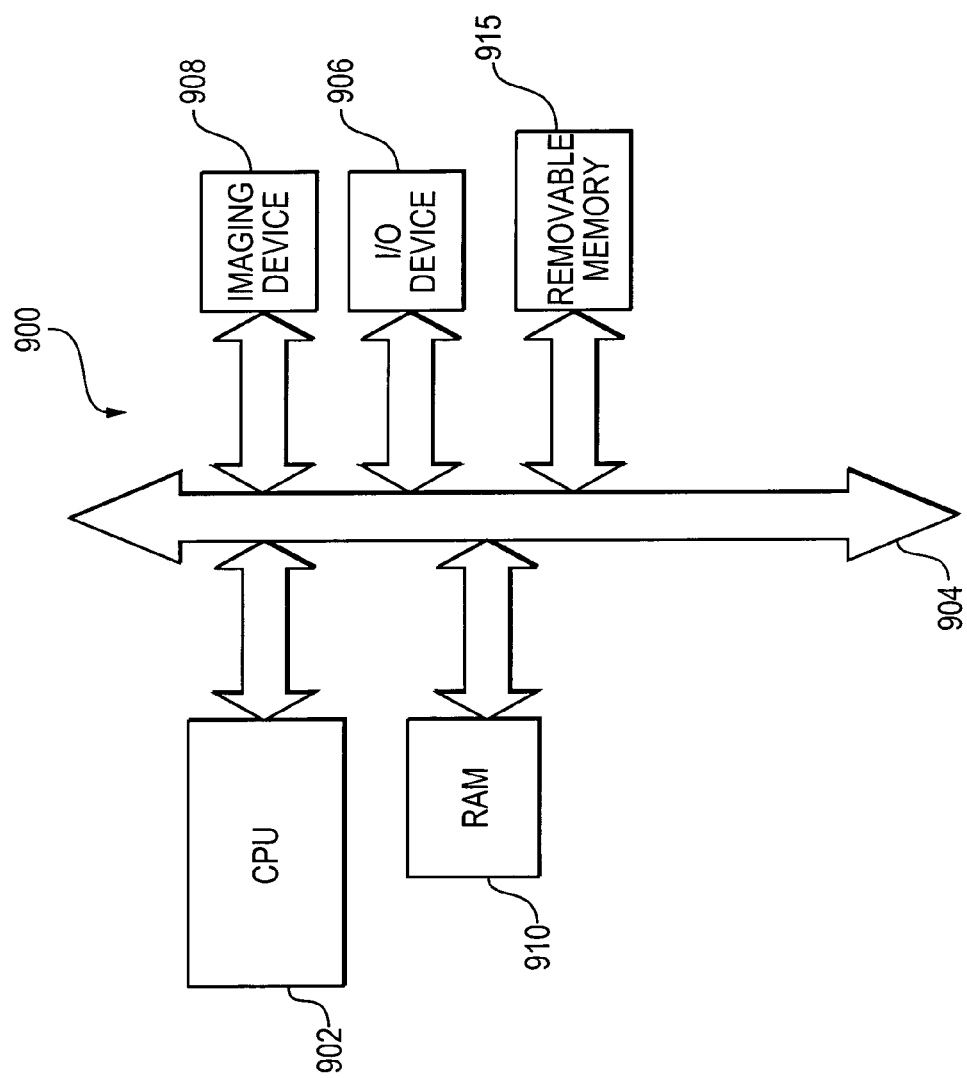

US 7,652,704 B2

PIXEL FOR BOOSTING PIXEL RESET VOLTAGE

FIELD OF THE INVENTION

The invention relates generally to improving the control and operation of an imager pixel.

BACKGROUND OF THE INVENTION

Various imager circuits have been proposed such as charge coupled device (CCD) arrays, complementary metal oxide semiconductor (CMOS) arrays, arrays combining both CCD and CMOS features, as well as hybrid infrared focal-plane arrays (IR-FPAs). Conventional arrays have light-sensing elements, typically referred to as "pixels" and readout circuitry that outputs signals indicative of the light sensed by the pixels.

A CMOS imager, for example, includes a focal plane array of pixel cells; each cell includes a photodetector (e.g., a photogate, photoconductor or a photodiode) overlying a substrate for producing a photo-generated charge in a doped region of the substrate. A readout circuit is provided for each pixel cell and includes at least a source follower transistor and a row select transistor for coupling the source follower transistor to a column output line. The pixel cell also typically has a storage region, connected to the gate of the source follower transistor. Charge generated by the photodetector is sent to the storage region. The imager may also include a transistor for transferring charge from the photodetector to the storage region and another transistor for resetting the storage region to a predetermined charge level prior to charge transference.

FIG. 1 illustrates a block diagram of a CMOS imager device 908 having a pixel array 200 with each pixel cell being constructed as described above, or as other known pixel cell circuits. Pixel array 200 comprises a plurality of pixels arranged in a predetermined number of columns and rows (not shown). The pixels of each row in array 200 are all turned on at the same time by a row select line, and the pixels of each column are selectively output by respective column select lines. A plurality of row and column lines are provided for the entire array 200. The row lines are selectively activated in sequence by a row driver 210 in response to row address decoder 220. The column select lines are selectively activated in sequence for each row activation by a column driver 260 in response to column address decoder 270. Thus, a row and column address is provided for each pixel.

The CMOS imager 908 is operated by a control circuit 250, which controls address decoders 220, 270 for selecting the appropriate row and column lines for pixel readout. Control circuit 250 also controls the row and column driver circuitry 210, 260 so that they apply driving voltages to the drive transistors of the selected row and column lines. The pixel output signals typically include a pixel reset signal $V_{rst}$ taken off of the storage region when it is reset by the reset transistor and a pixel image signal $V_{sig}$, which is taken off the storage region after photo-generated charges are transferred to it. The $V_{rst}$ and $V_{sig}$ signals are read by a sample and hold circuit 265 and are subtracted by a differential amplifier 267, to produce a differential signal $V_{rst}$-$V_{sig}$ for each pixel. $V_{rst}$-$V_{sig}$ represents the amount of light impinging on the pixels. This difference signal is digitized by an analog-to-digital converter 275. The digitized pixel signals are fed to an image processor 280 to form a digital image output. The digitizing and image processing can be located on or off the imager chip. In some arrangements the differential signal $V_{rst}$-$V_{sig}$ can be amplified as a differential signal and directly digitized by a differential analog to digital converter.

FIG. 2 illustrates a four transistor (4T) CMOS imager pixel cell 100. Pixel cell 100 includes a photodiode 102 connected to a transfer transistor 104. The transfer transistor 104 is also connected to storage region 108. A reset transistor 106, a capacitor 107 and a gate of a source follower transistor 110 are connected to storage region 108. A row select transistor 112 is connected to source follower transistor 110. The active elements of pixel cell 100 perform the functions of (1) photon to charge conversion by photodiode 102; (2) resetting the storage region to a known state before the transfer of charge to it by reset transistor 106; (3) transfer of charge to the storage region 108 by the transfer transistor 104; (4) selection of the cell 100 for readout by row select transistor 112; and (5) output and amplification of a signal representing a reset voltage (i.e., $V_{rst}$) and a pixel signal voltage (i.e., $V_{sig}$) based on the charges present on storage region 108 by source follower transistor 110. Capacitor 107 is utilized because charges produced during an integration period by photodiode 102 may be greater than the capacity of storage region 108. Accordingly, capacitor 107 provides additional charge storage capacity. The pixel cell 100 of FIG. 2 is formed on a semiconductor substrate as part of an imager device pixel array (e.g., array 200 of FIG. 1).

FIG. 3 illustrates a timing diagram for the FIG. 2 circuit 300 during pixel readout. Initially, the storage regions 108 of all pixels in an imager array 200 (FIG. 1) are set to a predetermined voltage to ensure that all source follower transistors 110 remain turned off. The ROW signal of the pixel intended to be read is pulsed high at time t1 providing an operating voltage across source follower transistor 110. The storage region 108 of the pixel intended to be sampled is then reset at time t2 by briefly turning on reset transistor 106, which is supplied with operating voltage VCC plus a Vt threshold voltage of the reset transistor 106 when signal RST goes high, thereby resetting storage region 108 to a predetermined voltage. The reset voltage level on the storage region 108 is then applied to the gate of source follower transistor 110, which converts it to a reset output voltage $V_{rst}$ on a column output line. The output signal is subsequently sampled at time t3, for example by a sample and hold circuit 265 (FIG. 1), where a high pulse SHR is used to sample and hold the reset output voltage $V_{rst}$ onto a first sample and hold capacitor.

Charge stored in photodiode 102 from an integration period is subsequently transferred to storage region 108 by signal TX going high at time t4 thereby, turning on transfer transistor 104. The transferred charge lowers the voltage on the storage region 108 to a pixel output signal level, which is applied to the gate of source follower transistor 110. Source follower transistor 110, which is supplied with operating voltage VCC, converts the signal voltage level to a signal output voltage $V_{sig}$ on the column output line. Sample and hold circuit 265 (FIG. 1) in response to a sample/hold pulse SHS at time t5 causes the pixel's signal output voltage $V_{sig}$ on the column line to be stored in a second sample and hold capacitor. After $V_{sig}$ is sampled, the ROW signal is set to a low voltage and the pixel circuit is ready for a next image capture.

Since transfer transistor 104 is positioned between photodiode 102 and storage region 108, the storage region 108 can be reset prior to transferring electrons. This permits a correlated double sampling operation resulting in reduced kTC noise and image noise.

With the pixel circuit configuration of FIG. 2 during reset, in order to obtain a maximum voltage swing at storage region 108, the reset transistor gate voltage is boosted to VCC+Vt (a threshold voltage of reset transistor 106). By adding voltage Vt to the reset voltage, the storage region 108 can be reset to VCC allowing a greater output signal swing from the source follower transistor 110 in response to charges transferred to the storage region 108 from photodiode 102. This technique requires additional supply voltage boost circuits to boost the reset voltage which increases the size, power consumption, design complexity and costs of the pixel and associated circuit.

BRIEF SUMMARY OF THE INVENTION

Exemplary method and apparatus embodiments of the present invention provide a new pixel design for an imager in which the row transistor that selects the pixel row for operation and readout is electrically coupled to and is operated in a manner which boosts the reset voltage applied to the storage region thereby eliminating the need for a supply voltage boosting circuit In one exemplary embodiment, the pixel cell includes a photosensor, a storage region for receiving transferred charges from the photosensor, a reset transistor for the resetting the storage region, which is operated by a reset control signal, a source follower output transistor having a gate coupled to the storage region for providing a selective readout in response to a row select signal, a row select transistor coupled between a power source and the source follower output transistor for providing an output signal onto an output column line and a capacitance coupled between the storage region and a source terminal of the row select transistor. When the row select transistor is turned on shortly after a reset transistor is turned on, the row select transistor boosts the reset voltage on the storage region by adding the initial pulse voltage to the reset voltage supplied by the reset transistor. The capacitance also provides increased charge storage for the storage region when charge is transferred to the storage region from the photosensor. The capacitance may be provided by parasitic capacitance or by an added capacitor In another exemplary embodiment, the pixel cell includes a photosensor, a storage region for receiving transferred charges from the photosensor, a reset transistor for the resetting of the storage region, which is operated by a reset control signal, a source follower output transistor having a gate coupled to the storage region for providing a readout signal, a row select transistor connected to the source of the source follower output transistor in response to a row select signal to thereby output a readout signal onto an output column line and a capacitor coupled between the gates of the source follower transistor and the row select transistor. When the row select transistor turns on, after the reset transistor turns on, a voltage pulse to boost the reset voltage on the storage region is provided.

BRIEF DESCRIPTION OF THE DRAWINGS

These and other features and advantages of the invention will be better understood from the following detailed description, which is provided in connection with the accompanying drawings, in which:

FIG. 7 is a diagram of a processing system which employs an imager employing an array of pixels constructed in accordance with the FIG. 4 and FIG. 5 circuits.

DETAILED DESCRIPTION OF THE INVENTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention. Additionally, certain processing steps are described and a particular order of processing steps is disclosed; however, the sequence of steps is not limited to that set forth herein and may be changed as is known in the art, with the exception of steps or acts necessarily occurring in a certain order.

The terms "wafer" and "substrate" are to be understood as interchangeable and as including silicon, silicon-on-insulator (SOI) or silicon-on-sapphire (SOS), doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions, junctions or material layers in or on the base semiconductor structure or foundation. In addition, the semiconductor need not be silicon-based, but could be based on silicon-germanium, germanium, gallium arsenide, or other known. semiconductor materials.

The term "pixel" refers to a photo-element unit cell containing a photo-conversion device or photosensor, for example, a photogate, photoconductor or a photodiode and transistors for processing an electrical signal from electromagnetic radiation sensed by the photo-conversion device. The embodiments of pixels discussed herein are illustrated and described as employing four transistor (4T) pixel circuits which use a transfer transistor to gate charge from a photosensor to a storage region for the sake of example only. It should be understood that the invention may be used with other pixel arrangements having more or less than four transistors and in arrangements which do not use a transfer transistor.

Figure 1:
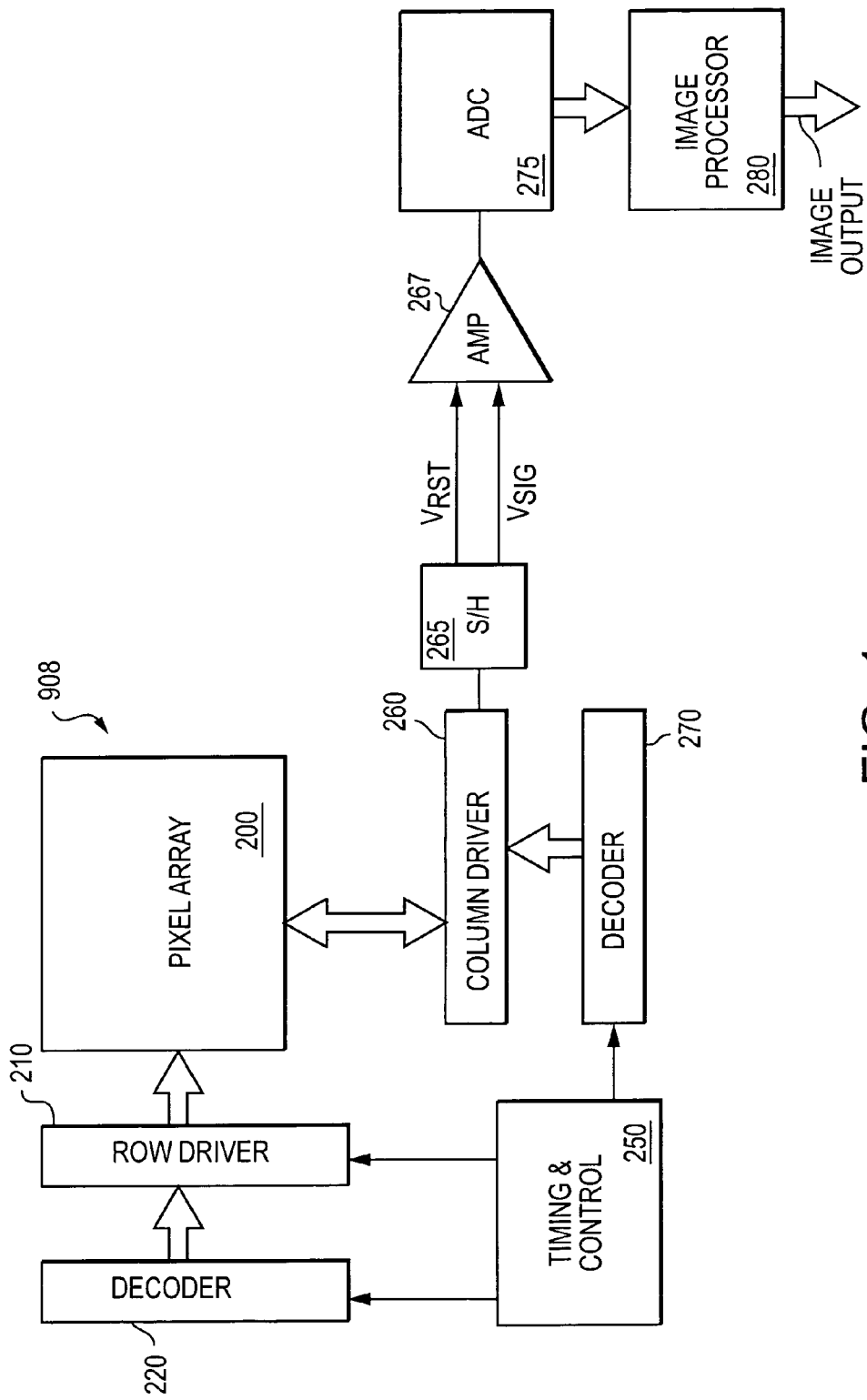
FIG. 1 is a block diagram of a conventional imager device.
Figure 2:
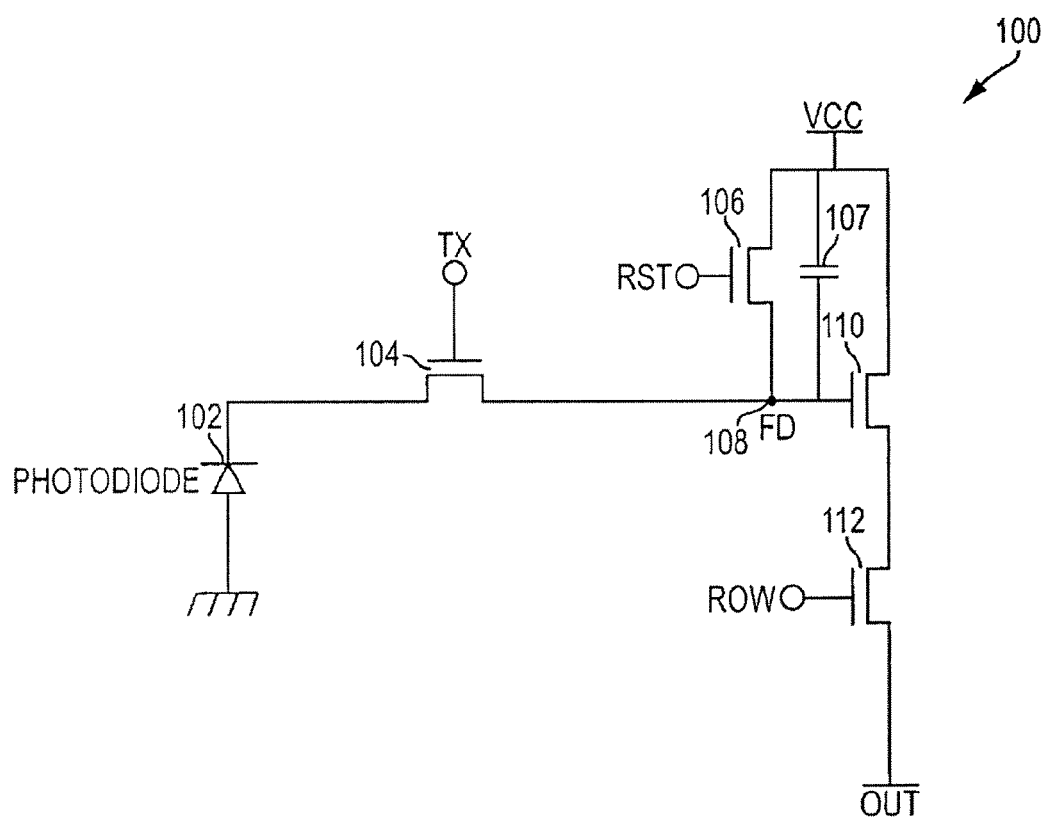
FIG. 2 is a schematic diagram of a conventional four transistor pixel.

Although the invention is described herein with reference to the architecture and fabrication of one pixel cell, it should be understood that this is representative of a plurality of pixels in an array of an imager device such as array 200 of imager device 908 (FIG. 1). In addition, although the invention is described below with reference to a CMOS imager, the invention has applicability to any solid state imaging device having a storage node which is reset and then has charges transferred to it. The following detailed description is, therefore, not to be taken in a limiting sense, and the scope of the present invention is defined only by the appended claims.

Figure 4:
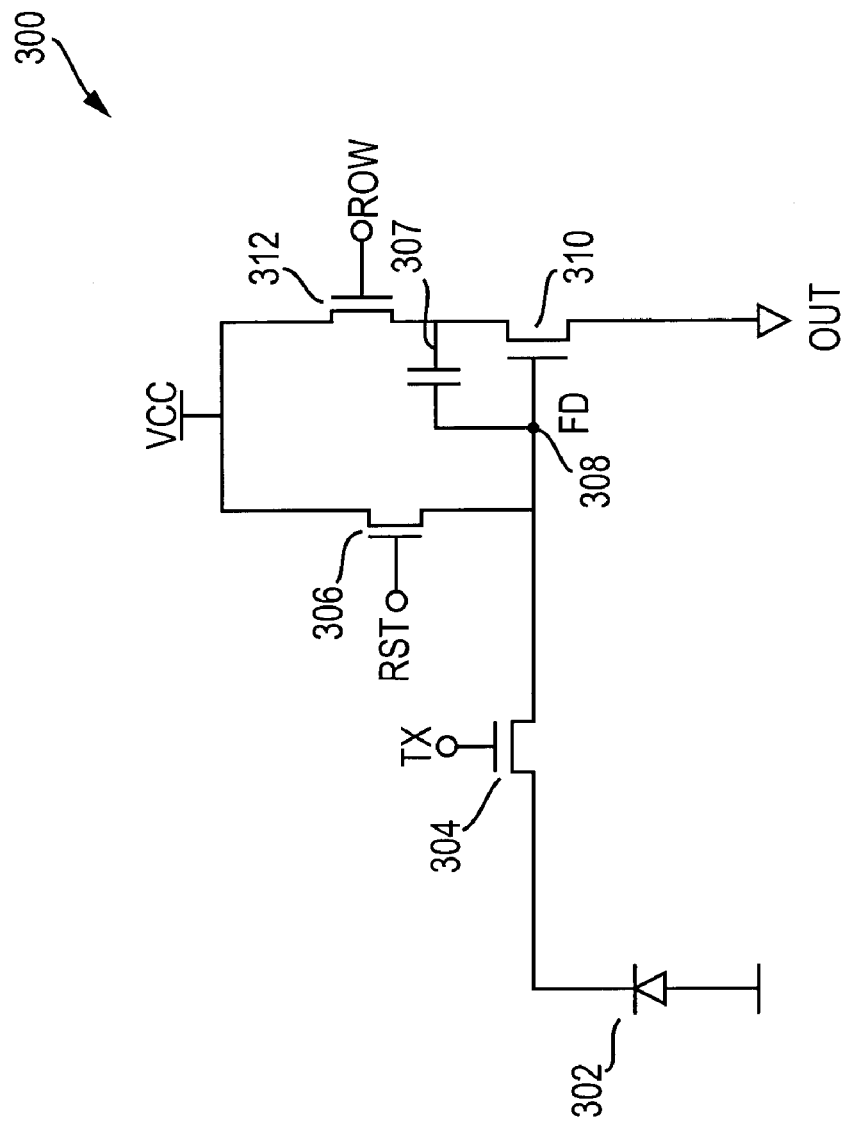
FIG. 4 is a schematic circuit diagram according to a first exemplary embodiment of the invention.

FIG. 4 illustrates a pixel circuit 300 according to a first exemplary embodiment of the invention. Pixel circuit 300 includes a photodiode 302 connected to a transfer transistor 304. The transfer transistor 304 is also connected to storage region 308. A reset transistor 306 and a source follower transistor 310 are connected to storage region 308. However, unlike circuit 100, the drain of row select transistor 312 is connected to voltage source VCC and the source is connected to source follower transistor 310. Also, one end of capacitor 307 is connected to the source of the row select transistor 112, while the other is connected to the storage region 108. With this arrangement, when the row select transistor 312 is first turned on, a voltage boost is applied to the storage region 308. If the reset transistor 306 is pulsed (on/off) just prior to the row select transistor 312, the storage region will see both the reset voltage applied by reset transistor 306 and the voltage boost caused by the turn on of the row select transistor 312. Other voltage coupling devices may be utilized instead of capacitor 307, such as a reverse biased diode.

Figure 3:
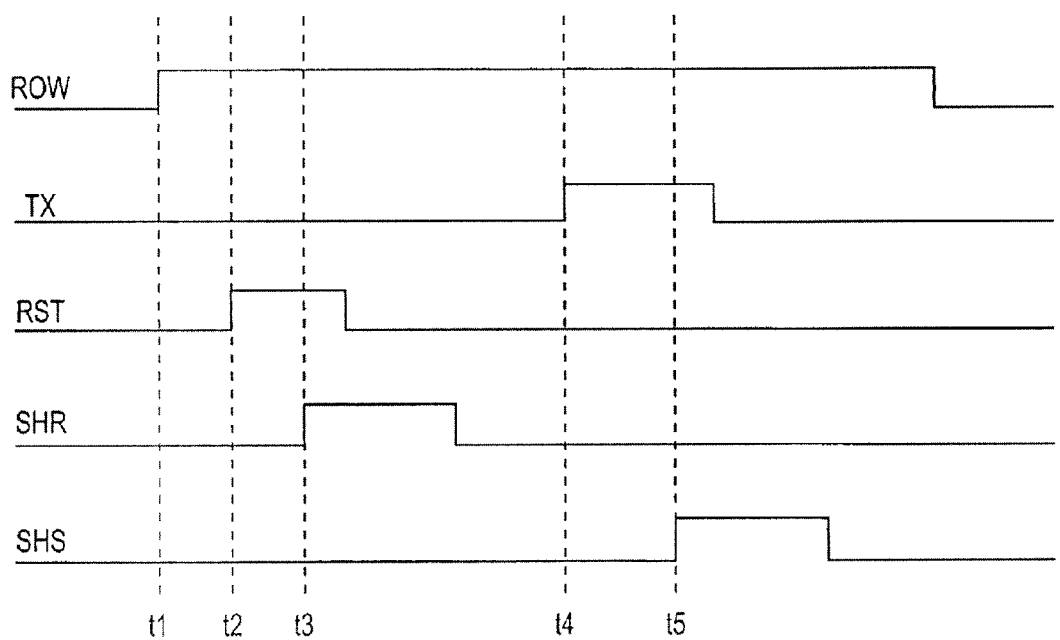
FIG. 3 is a timing diagram for charge readout of a conventional four transistor pixel.

As noted above with respect to the pixel readout of circuit 100 (FIG. 3), the reset voltage level is created by turning on the reset transistor 106 thereby resetting the storage region 108. The reset voltage level is applied to the gate of the source follower transistor 110, which converts it to a reset output voltage $V_{rst}$ on a column output line. The boosted voltage provided by turning on the row select transistor is also applied to the storage region 108 and gate of source follower transistor 110. The pixel circuit 300 configuration and timing during pixel readout (FIG. 6) provides a boosted reset signal, which is sampled to provide $V_{rst}$ during charge integration (a period in which photodiode 302 generates signal charge in response to incident light). Thus, it is not required to have a voltage supply boosting circuit.

The reset signal on the storage region is boosted due to the operation of capacitor 307 when the row select transistor 312 turns on in response to the leading edge of a row select pulse. In addition, if only a slight boost is required to sample the reset signal, the capacitor 307 may be omitted in which case the parasitic capacitance between the gate/source junction of the source follower transistor 310 may be utilized to provide a reset voltage boost to the storage region 308.

Figure 5:
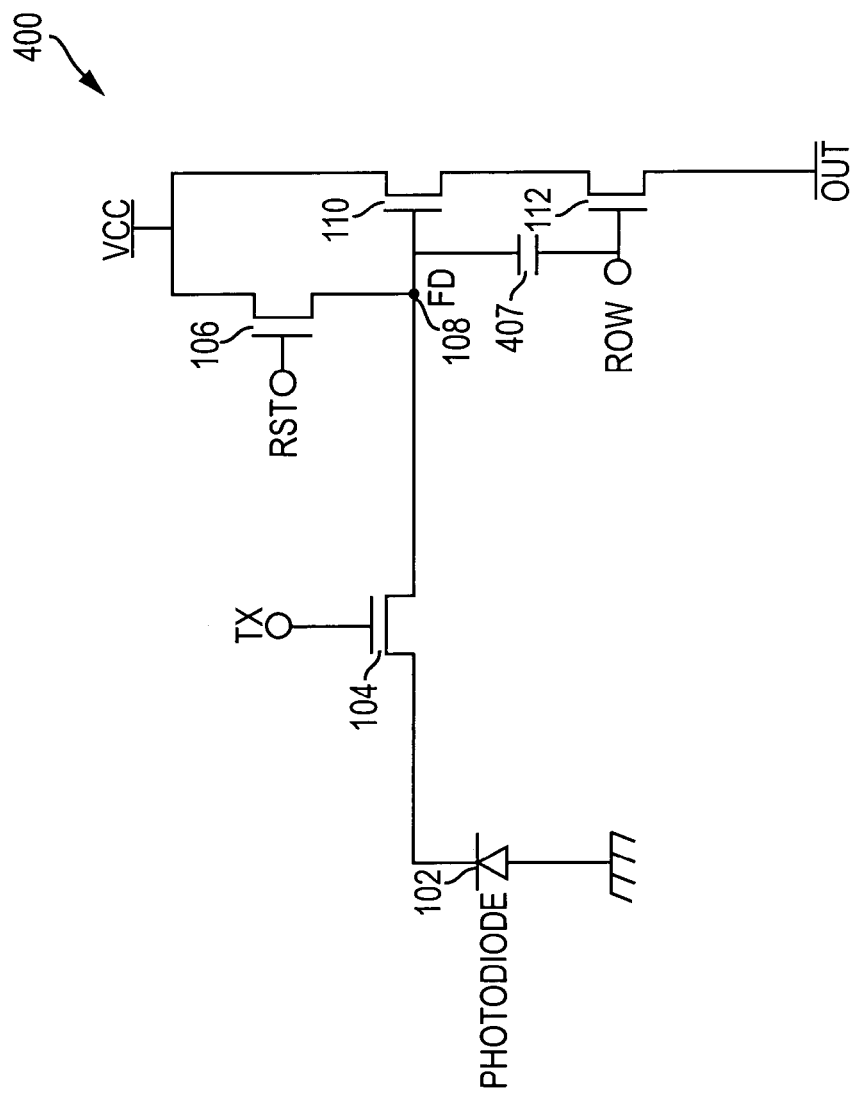
FIG. 5 is a schematic circuit diagram according to a second exemplary embodiment of the invention.

FIG. 5 illustrates a pixel circuit 400 according to a second exemplary embodiment of the invention. Pixel circuit 400 is similar to pixel circuit 100; however, instead of having a capacitor coupled between the storage region 108 and VCC, one end of capacitor 407 is connected to the gate of the row select transistor 112, while the other is connected to the storage region 108. Accordingly, when the row select control signal is applied to the gate of the row select transistor 112, it provides a boosted reset signal at the storage region 108. Other voltage coupling devices may be utilized instead of capacitor 407, such as a reverse biased diode.

Figure 6:
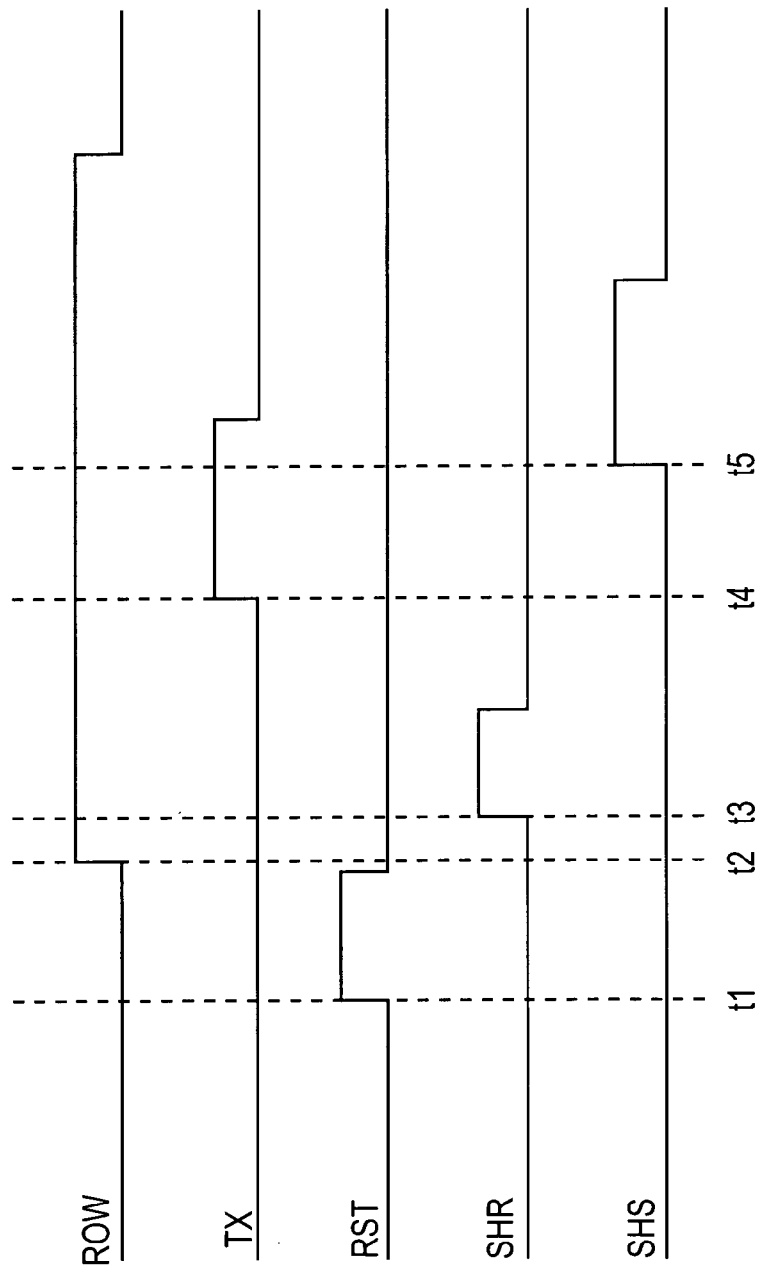
FIG. 6 is a timing diagram for charge readout of the FIG. 4 and FIG. 5 circuits.

FIG. 6 illustrates a timing diagram for circuit 300 and circuit 400 during pixel readout. During a readout operation, the reset enable signal RST applied to the gate of reset transistor 106 is pulsed (on/off) prior to row enable signal ROW being pulsed high.

Initially, the storage region (308/108) of a pixel in an imager array 200 is set to a predetermined voltage (near VCC). At time t1, the storage region (308/108) of the pixel intended to be sampled is then reset by briefly turning on reset transistor (306/106), which is supplied with operating voltage VCC when signal RST goes high, thereby resetting storage region (308/108) to a predetermined voltage. The reset voltage level on the storage region (308/108) is then applied to the gate of source follower transistor (310/110). After the RST pulse goes low, the ROW signal of the pixel intended to be read is pulsed high at time t2 providing a voltage boost to the reset voltage on the gate of the source follower transistor (310/110). The boosted reset signal provided from the row select gate voltage is subsequently sampled at time t3, for example by a sample and hold circuit 265 (FIG. 1), where a high pulse SHR is used to sample and hold the reset output voltage $V_{rst}$ onto a first sample and hold capacitor.

Charge stored in photodiode (302/102) during an integration period is subsequently transferred to storage region (308/108) by signal TX going high at time t4 thereby, turning on transfer transistor (304/104). The transferred charge lowers the voltage on the storage region (308/108) to a pixel output signal level, which is applied to the gate of source follower transistor (310/110). Source follower transistor (310/110), which is supplied with operating voltage VCC through the row select transistor (312/112), converts the signal voltage level to a signal output voltage $V_{sig}$ on the column output line. Sample and hold circuit 265 (FIG. 1) in response to a sample/hold pulse SHS at time t5 causes the pixel's signal output voltage $V_{sig}$ on the column line to be stored in a second sample and hold capacitor. After $V_{sig}$ is sampled, the ROW signal is set to a low voltage and the pixel circuit is ready for a next image capture.

By pulsing RST high at t1 prior to pulsing ROW high at t2, a boosting of the predetermined reset voltage is achieved. This boost is attributed to a capacitive coupling between the storage region 308 (FIG. 4) and the source of the row select transistor 310 (FIG. 4), or capacitive coupling between the storage region 108 (FIG. 5) and the gate of the row select transistor 112 (FIG. 5).

FIG. 7 illustrates a processor-based system 900 including an imaging device 908 of FIG. 1 modified to contain pixels in the array 200 which are constructed in accordance with the invention. The processor-based system 900 is exemplary of a system utilizing an imaging device 908 which includes a pixel array having pixels constructed and operated in accordance with the invention. Without being limiting, such a system could include a camera system, computer system, scanner, machine vision system, vehicle navigation system, video-phone, surveillance system, auto focus system, star tracker system, motion detection system, and others.

The processor-based system 900, for example a camera system, generally comprises a central processing unit (CPU) 902, such as a microprocessor, that communicates with an input/output (I/O) device 906 over a bus 904. Imaging device 908 also communicates with the CPU 902 over bus 904. The processor-based system 900 also includes random access memory (RAM) 910, and can include removable memory 915, such as flash memory, which also communicate with CPU 902 over the bus 904. Imaging device 908 may be combined with a processor, such as a CPU, digital signal processor, or microprocessor, with or without memory storage on a single integrated circuit or on a different chip than the processor.

Various embodiments of the invention have been illustrated using a photodiode as the charge conversion device, and in the environment of a four transistor pixel. However, it should be appreciated that the invention is not so limited and can be used in any pixel architecture employing a row select transistor and source follower transistor coupled in the fashion similar to the circuit described above, which is used for eliminating the need to boost the voltage of a reset signal. Also, other types of photosensors may be used to generate image charge. The invention may also be used in a readout circuit for a CCD (charge coupled device) array. Accordingly, it is not intended that the present invention be strictly limited to the above-described and illustrated embodiment. Any modifications, though presently unforeseeable, of the present invention that comes within the spirit and scope of the following claims should be considered part of the present invention.

What is claimed as new and desired to be protected by Letters Patent of the United States is:

1. A pixel circuit for an imaging device, said pixel circuit comprising:
   a photosensor for generating charge during an integration period;
   a storage node for receiving said generated charge from said photosensor;
   an output transistor coupled to said storage node for converting a charge signal at said storage node to an output voltage;
   a reset transistor for applying a reset voltage to said storage node;
   a row select transistor coupled to said output transistor for selectively enabling said pixel circuit to output said output voltage;
   a voltage source directly connected to a drain of said row select transistor and a drain of said reset transistor for providing an operating voltage to said pixel circuit; and
   a capacitive coupling between said row select transistor and said storage node for boosting a reset voltage applied to said storage node by said reset transistor when said row select transistor is activated.

2. The circuit of claim 1, wherein said output transistor provides an output signal based on said charge at the storage node.

3. The circuit of claim 1 further comprising a transfer transistor connected to said photosensor for transferring charge from said photosensor to said storage node.

4. The circuit of claim 1, wherein said row select transistor is coupled between a voltage source and a drain of said output transistor.

5. The circuit of claim 4, wherein said capacitive coupling comprises a capacitor connected between said storage node and a source of said row select transistor.

6. An imaging circuit for an imaging device, comprising:
   a storage node for receiving photo-generated charge;
   an output transistor coupled to said storage node for converting a charge signal at said storage node to an output voltage;
   a reset transistor for applying a reset voltage to said storage node, a gate of said reset transister being controlled by a reset signal;
   a select transistor coupled between a voltage source and a drain of said output transistor for selectively providing said output voltage; and
   a capacitive coupling between said row select transistor and said storage node for boosting a reset voltage applied to said storage node by said reset transistor when said select transistor is activated.

7. The circuit of claim 6, wherein said output transistor provides an output signal based on said charge at the storage node.

8. The circuit of claim 6, wherein said capacitive coupling comprises a capacitor connected to said storage node and a source of said select transistor.

9. A pixel circuit for an imaging device, said pixel circuit comprising:
   a photosensor for generating charge during an integration period;
   a storage node for receiving said generated charge from said photosensor;
   a row select transistor coupled to an output transistor for selectively enabling said pixel circuit to output an output voltage;
   a reset transistor coupled to said storage node for applying a reset voltage to said storage node;
   a voltage source directly connected to a drain of said row select transister and a drain of said rest transister for providing an operating votage to said pixel cicuit; and
   a circuit for applying an additional voltage, separate from the reset voltage applied by said reset transistor, to said storage node.

10. The circuit of claim 9 further comprising a readout circuit for reading out stored charge from said storage node and providing an output signal based on said charge at the storage node.

11. The circuit of claim 9 further comprising a transfer transistor connected to said photosensor for transferring charge from said photosensor to said storage node.

12. The circuit of claim 9 further comprising an output transistor coupled to said storage node for converting said generated charge to an output voltage.

13. An integrated circuit comprising: a pixel array, at least one pixel of said array comprising:
   a photosensor for generating charge during an integration period;
   a storage node for receiving said generated charge from said photosensor;
   an output transistor coupled to said storage node for converting a charge signal at said storage node to an output voltage;
   a reset transistor for applying a reset voltage to said storage node;
   a row select transistor coupled to said output transistor for selectively enabling said to output transistor; and
   a voltage source directly connected to a drain of said row select transister and a drain of said rest transister for providing an operating votage to said pixel cicuit; and
   a capacitive coupling between said row select transistor and said storage node for boosting a reset voltage applied to said storage node by said reset transistor when said row select transistor is activated.

14. The circuit of claim 13 further comprising a transfer transistor connected to said photosensor for transferring charge from said photosensor to said storage node.

15. The circuit of claim 13, wherein said row select transistor is coupled between a voltage source and a drain of said output transistor.

16. The circuit of claim 15, wherein said capacitive coupling comprises a capacitor connected between said storage node and a source of said row select transistor.

17. An imaging system comprising: a processor; and an imaging device comprising an array of pixels coupled to said processor, each pixel including:
   a photosensor for generating charge during an integration period; a storage node for receiving said generated charge from said photosensor;
   an output transistor coupled to said storage node for converting a charge signal at said storage node to an output voltage;
   a reset transistor for applying a reset voltage to said storage node;
   a row select transistor coupled to said output transistor for selectively enabling said output transistor;
   a voltage source directly connected to a drain of said row select transister and a drain of said rest transister for providing an operating votage to said pixel cicuit; and a capacitive coupling coupled between said row select transistor and said storage node for boosting a reset voltage applied to said storage node by said reset transistor when said row select transistor is activated.

18. The system of claim 17 further comprising a transfer transistor connected to said photosensor for transferring charge from said photosensor to said storage node.

19. The system of claim 17, wherein said row select transistor is coupled between a voltage source and a drain of said output transistor.

20. The system of claim 19, wherein said capacitive coupling comprises a capacitor connected between said storage node and a source of said row select transistor.

* * * * *

UNITED STATES PATENT AND TRADEMARK OFFICE
CERTIFICATE OF CORRECTION

PATENT NO. : 7,652,704 B2 Page 1 of 1
APPLICATION NO. : 10/925172
DATED : January 26, 2010
INVENTOR(S) : Mauritzson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1554 days.

Signed and Sealed this

Twenty-third Day of November, 2010

David J. Kappos
*Director of the United States Patent and Trademark Office*